United States Patent [19]

Suyama et al.

[11] Patent Number: 5,424,890

[45] Date of Patent: Jun. 13, 1995

[54] MAGNETORESISTANCE EFFECT TYPE THIN FILM HEAD

[75] Inventors: Hideo Suyama; Tetsuo Sekiya; Munekatsu Fukuyama; Norio Saito; Takuji Shibata, all of Shinagawa, Japan

[73] Assignee: Sony Corporation, Tokyo, Japan

[21] Appl. No.: 295,229

[22] Filed: Aug. 24, 1994

Related U.S. Application Data

[63] Continuation of Ser. No. 104,421, Aug. 9, 1993, abandoned, which is a continuation of Ser. No. 768,970, Dec. 5, 1991, abandoned.

[30] Foreign Application Priority Data

Feb. 5, 1990 [JP] Japan .................. 2-25799

[51] Int. Cl.[6] ............................................. G11B 5/39
[52] U.S. Cl. .................................................... 360/113
[58] Field of Search .......................................... 360/113

[56] References Cited

U.S. PATENT DOCUMENTS

| | | | |
|---|---|---|---|
| 4,068,272 | 1/1978 | Kanai et al. | 360/113 |
| 4,142,218 | 2/1979 | Gorter | 360/113 |

FOREIGN PATENT DOCUMENTS

| | | | |
|---|---|---|---|
| 58-32221 | 2/1983 | Japan . | |
| 61-96508 | 5/1986 | Japan . | |
| 6419512 | 1/1989 | Japan . | |
| 5-128447 | 10/1991 | Japan | 360/113 |
| 94/19794 | 2/1994 | WIPO | 360/113 |

OTHER PUBLICATIONS

IEEE Transactions on Magnetics, vol. 24, No. 6, Nof. 1989 H. Suyama et al "Thin Film MR Head for high density rigid disk drive", pp. 2612–2614, especially FIG. 1.

Primary Examiner—John H. Wolff
Attorney, Agent, or Firm—Hill, Steadman & Simpson

[57] ABSTRACT

A magnetoresistance effect type thin film head (A) constructed in a manner that a magnetoresistance effect element, that is, an MR element (1) is disposed perpendicularly to a head surface a, and among two electrodes (2a) and (2b) led out from both ends of the MR element (1), the one electrode (2a) is exposed to the head surface a but the other electrode (2b) is not exposed to the head surface a, wherein the one electrode (2a) exposed to the head surface a is connected to a ground voltage Vss, thereby decreasing the change in voltage difference between the electrode (2a) of the MR element (1) and a disc surface b to prevent the electrical breakdown of the thin film head (A).

4 Claims, 3 Drawing Sheets

MAGNETORESISTANCE EFFECT TYPE THIN FILM HEAD

This is a continuation of application Ser. No. 08/104,421 filed Aug. 9, 1993, now abandoned, which in turn is a continuation of application Ser. No. 07/768,970 filed on Dec. 5, 1991, now abandoned.

TECHNICAL FIELD

The present invention relates to a MR (magnetoresistance effect) type thin film head utilizing such a phenomenon that a resistance value changes with a change in magnetism or magnetization, i.e., so called the magnetoresistance effect.

BACKGROUND ART

An example of conventional magnetoresistance effect type thin film head is constructed in a manner as shown in FIG. 4 that an MR element 21 is disposed such that its longitudinal side is in parallel with a head (sliding) surface a, and electrodes 22a and 22b are led out from both ends of the MR element 21. In this case the two electrodes 22a and 22b are exposed to the head surface a. Thus, in the conventional thin film head, both electrodes 22a and 22b contact at the same time with a major surface of an electrically conductive recording medium, particularly, a major surface b (hereinafter merely referred to as a disc surface) of a magnetic recording medium 23 of a disc-like configuration which is formed by the sputtering process and used in a hard disc apparatus. When both electrodes 22a and 22b contact with the disc surface b, a resistance value changes not only in the MR element 21 but also in a portion between the electrodes 22a and 22b, thereby causing large noises.

In order to obviate the drawback, there has been proposed another example of a thin film head which is constructed in a manner as shown in FIG. 5 that an MR element 21 is disposed such that its longitudinal side is perpendicular to the head surface a, and among two electrodes 22a and 22b led out from the MR element 21, the one electrode 22a is exposed to the head surface a but the other electrode 22b is not exposed to the head surface a. In this case, the MR element 21 of the above-described example is thin in thickness, but as shown in FIG. 6, the electrodes 22a and 22b of this example are thick in thickness and are made of metal material of a high conductivity, so that even when the one electrode 22a contacts with the disc surface b, the change in electrical resistance value between the electrodes 22a and 22b is a negligibly small value, thereby not causing large noises. Further, since the MR element 21 of this example is constituted such that two magnetic material layers 21a and 21b sandwich an intermediate layer 24 of nonmagnetic material therebetween, noises due to the Barkhausen effect, that is, the noises due to the movement of the magnetic domain walls can be prevented surely.

In general, when the hard disc apparatus is actually driven, the disc surface b repeatedly contacts with and separates from the head surface a, and the head surface a is spaced slightly from the disc surface b particularly when the disc is rotated.

In the thin film head of the example shown in FIG. 5, since the MR element 21 is supplied with a constant current, a voltage difference is generated between the disc surface b and the head surface a, particularly, the one electrode 22a of the head. In the state that the voltage difference is generated between the disc surface b and the one electrode 22a, when the head surface a closely approaches to the disc surface b or the head surface a contacts with the disc surface b, a large current immediately flows into the electrode 22a to cause electric discharge between the head surface a and the disc surface b, whereby the MR element 21 or the one electrode 22a is electrically broken by the discharge to thereby break the function of the head disadvantageously.

The present invention is performed in view of the above-described drawbacks of the conventional thin film head, and an object thereof is to provide a magnetoresistance effect type thin film head which is capable of reducing the change in voltage difference between the electrode of the MR element and the disc surface and preventing the breakages of the MR element and the electrode.

DISCLOSURE OF INVENTION

Accordingly, a magnetoresistance effect type thin film head A according to the present invention is constructed in a manner that an MR element 1 is disposed perpendicularly to a head surface a, and among two electrodes 2a and 2b led out from the MR element 1, the one electrode 2a is exposed to the head surface a but the other electrode 2b is not exposed to the head surface a, wherein the one electrode 2a exposed to the head surface a is connected to a ground voltage Vss, whereby the change in voltage difference between the one electrode 2a exposed to the head surface a and a disc surface b can be decreased. Thus, even when the head surface a contacts with or approaches to the disc surface b, the electrical discharge will not occur between the head surface a and the disc surface b. Namely, since such phenomenon that a large current flows into the one electrode 2a immediately can be prevented, the electrical breakdown of the MR element 1 and the one electrode 2a and also the electrical discharge breakdown of the thin film head A can be prevented.

BEST MODE FOR CARRYING OUT THE INVENTION

An embodiment of the present invention will be explained with reference to FIGS. 1 to 3.

Figure 1:
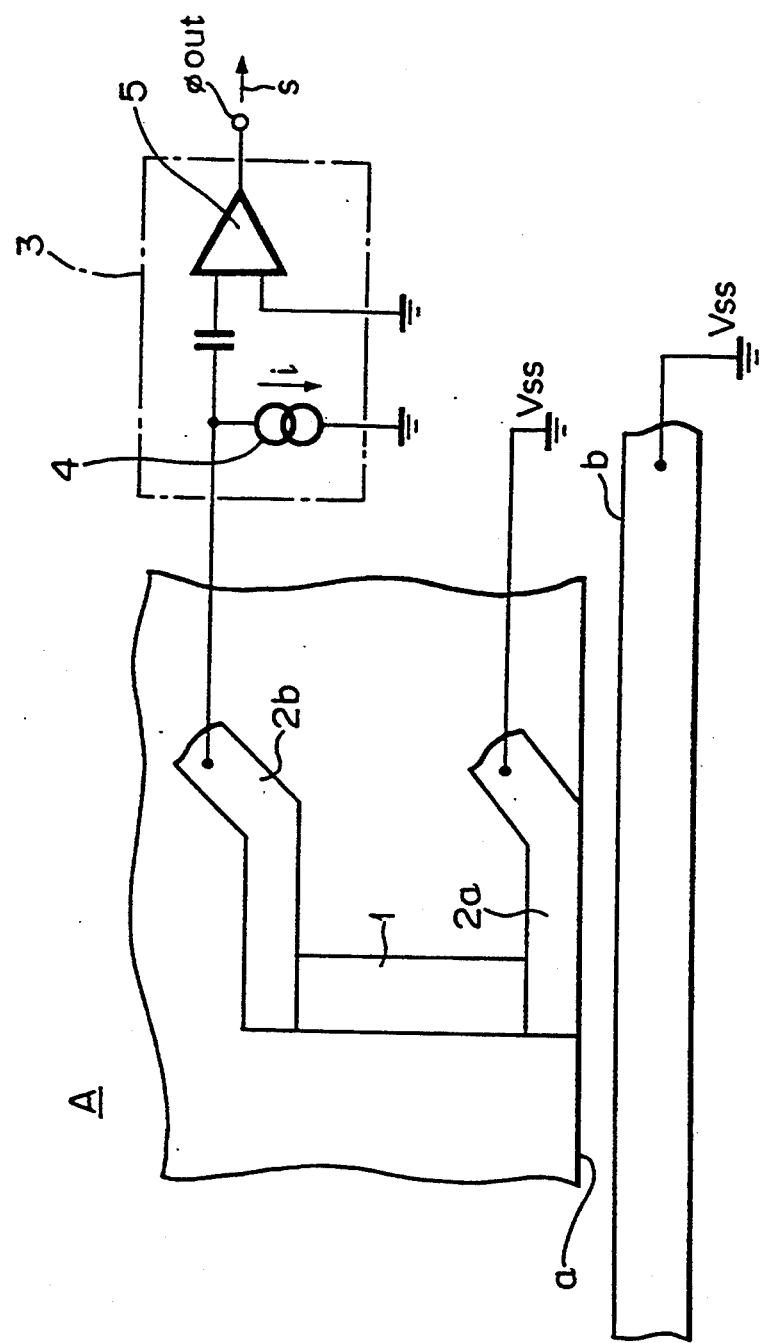
FIG. 1 is a diagram illustrating the constructions of a magnetoresistance effect type thin film head according to one embodiment of the present invention.
Figure 2:
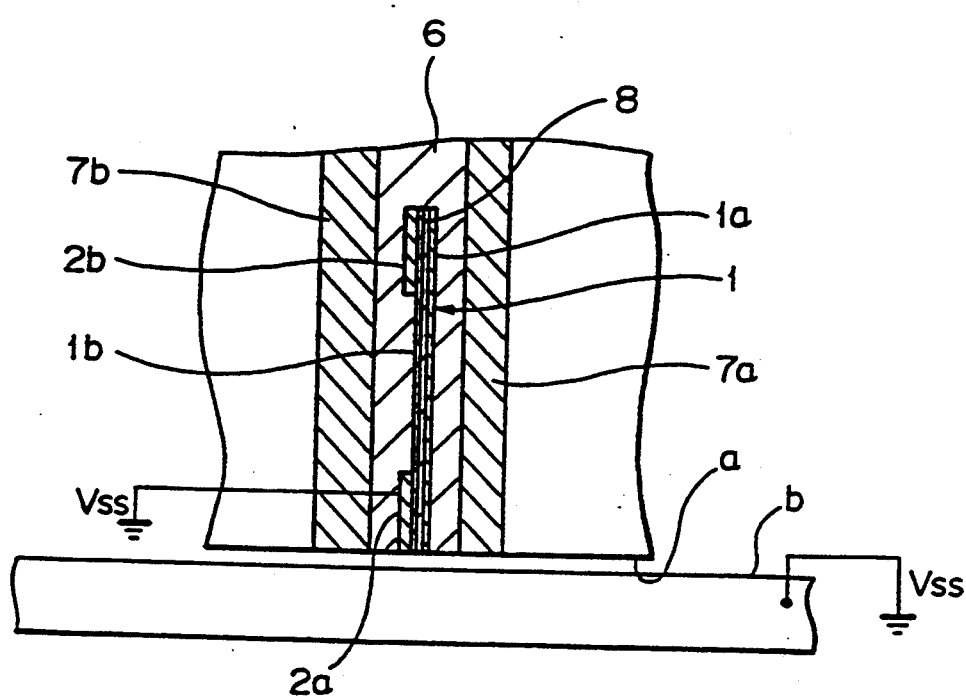
FIG. 2 is a sectional view thereof.

FIG. 1 is a diagram illustrating the constructions of a magnetoresistance effect type thin film head A according to the embodiment, and FIG. 2 is a sectional view thereof.

The thin film head A is constructed in a manner as shown in the drawings that an MR element 1 is disposed such that its longitudinal side is perpendicular to a head surface a, and among two electrodes 2a and 2b led out from the MR element 1, the one electrode 2a is exposed to the head surface a and opposed to a disc surface b, but the other electrode 2b is not exposed to the head surface a, wherein the other electrode 2b is connected to an amplifying portion 3 and the one electrode 2a is connected to a ground voltage Vss as well as the disc surface b. The MR element 1 is supplied with a constant current i by a constant current supply 4 in the amplifying portion 3, so that the change in electrical resistance value of the MR element 1 due to the magnetized state of the disc surface b is converted into the change in voltage between the electrodes 2a and 2b, and this voltage change is taken out from an output terminal φout through an amplifier 5 of the amplifying portion 3 as an output signal S of the thin film head A. The MR element 1 in this embodiment is constructed as shown in FIG. 2 such that two magnetic material films 1a and 1b sandwich an intermediate layer 8 of non-magnetic material therebetween, so that noises due to the Barkhausen effect, that is, the noises due to the movement of the magnetic domain walls can be prevented surely. Further, in this embodiment, soft magnetic material layers 7a and 7b are disposed at both sides of the MR element 1 such that they sandwich the MR element 1 therebetween through an insulating layer 6. The soft magnetic material layers 7a and 7b serve to magnetically shield the MR element 1 to thereby improve the resolution of the thin film head A.

As described above, according to this embodiment, among the two electrodes 2a and 2b led out from the both ends of the MR element 1, the one electrode 2a exposed to the head surface a is connected to the ground voltage Vss, so that the change in the voltage difference between the electrode 2a and the disc surface b can be made smaller. Thus, and so even when the head surface a contacts with or approaches to the disc surface b, there will not occur any electrical discharge therebetween. Accordingly, even under the above-mentioned state, such phenomenon that the large current flows into the electrode 2a immediately can be prevented, so that the electrical breakdown of the MR element 1 and the electrode 2a and also the electrical discharge breakdown of the thin film head A can be prevented to thereby improve the reliability of the thin film head A.

Figure 3:
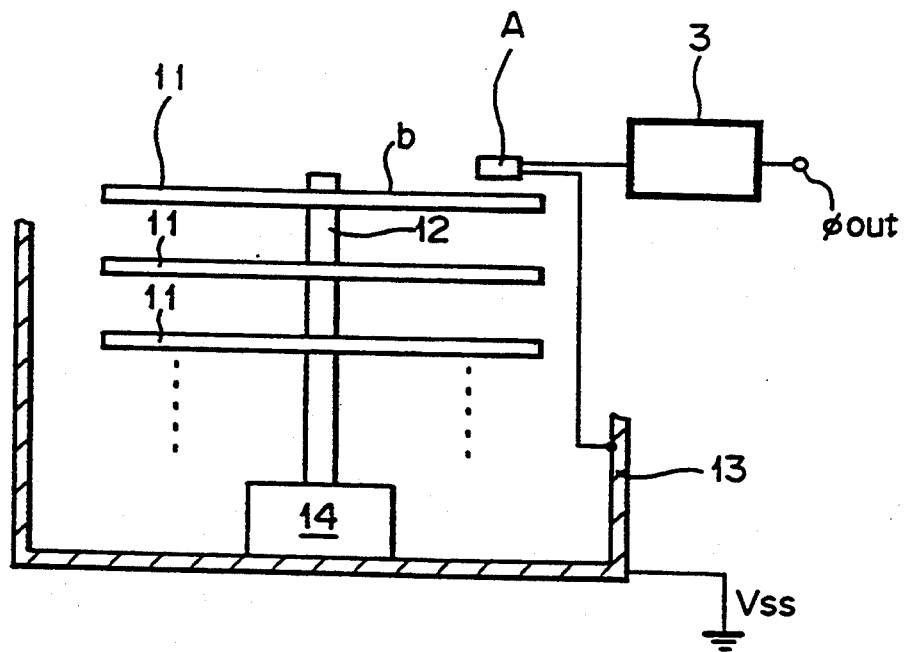
FIG. 3 is a diagram illustrating the constructions of a typical example of a hard disc apparatus according to the embodiment.
Figure 4:
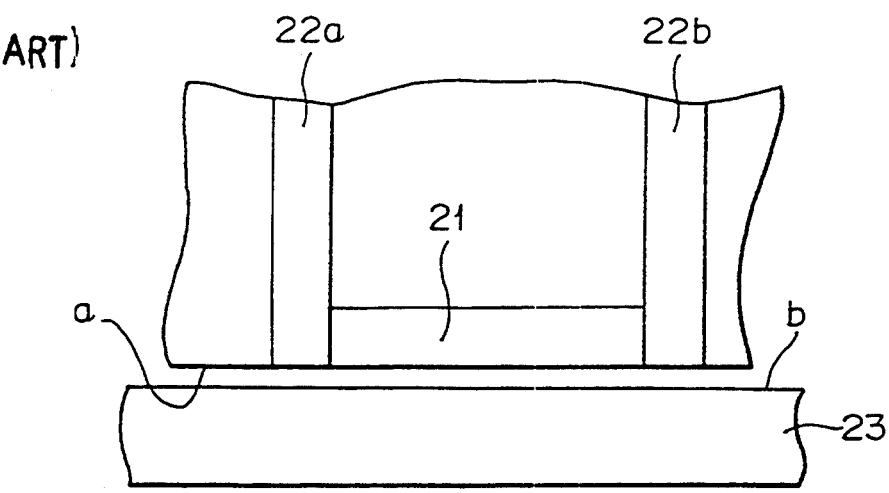
FIG. 4 is a diagram illustrating the constructions of an example of conventional magnetoresistance type thin film heads.
Figure 5:
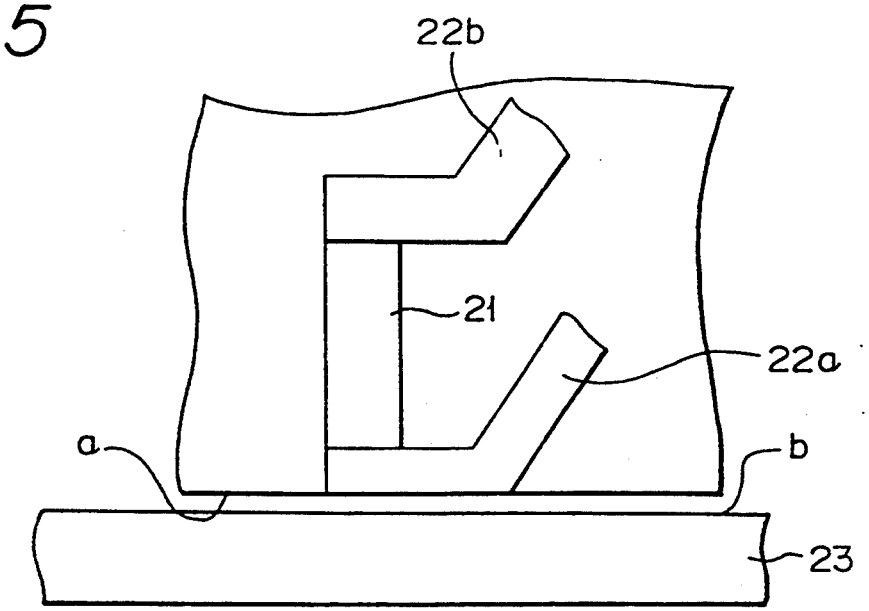
FIG. 5 is a diagram illustrating the constructions of another proposed example.
Figure 6:
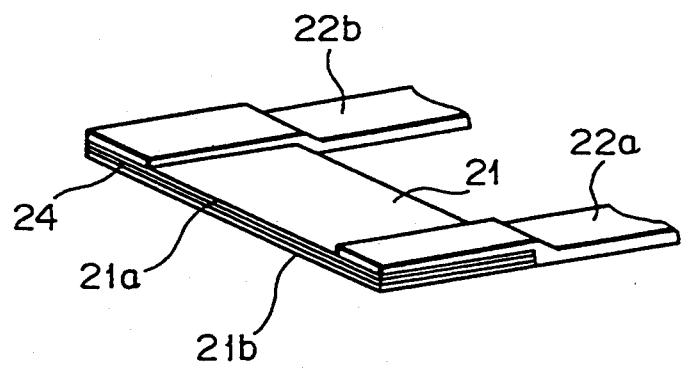
FIG. 6 is a perspective view illustrating the constructions of an MR element and electrodes.

Now, as shown in FIG. 3, when the hard disc apparatus is driven, each disc 11 is normally electrically connected to a metal case 13 of the disc 11 through a rotating shaft 12 and the disc has electrical conductivity of some degree so that the disc surface b does not become high in potential, but when the electrical conductivity of the disc through the rotating shaft 12 is insufficient, the voltage of the disc surface b inevitably fluctuates to some degree. Thus, in the present embodiment, the electrode 2a exposed to the head surface a is set to the ground voltage Vss, and further a disc rotating system 14 is commonly connected to the ground voltage Vss. Namely, since the ground voltage Vss is normally applied to the disc rotating system 14 including the disc 11 and the rotating disc 12 through the metal case 13, the electrode 2a is wired such that the ground voltage Vss is applied thereto through the metal case 13. In this configuration, the change in the voltage difference between the electrode 2a exposed to the head surface a and the disc surface b can be decreased.

We claim:

1. A magnetoresistance effect type thin film head comprising:
   a magnetoresistance effect element provided in which the longitudinal direction of said magnetoresistance effect element is vertical to a head surface facing the recording medium,
   two electrodes substantially arranged in parallel and respectively formed at a fore end and a rear end of said magnetoresistance effect element,
   wherein the electrode formed at the fore end extends along said head surface away from said magnetoresistance element, and is exposed along said head surface and connected to a ground voltage.

2. A magnetoresistance effect type thin film head having a surface for cooperating with a magnetic medium comprising:
   a magnetoresistance effect element composed of two magnetic layers and a nonmagnetic layer therebetween, the longitudinal direction of said magnetoresistance effect element being vertical to a head surface facing the recording medium,
   two electrodes substantially arranged in parallel and respectively formed at a fore end and a rear end of said magnetoresistance effect element,
   wherein the electrode formed at the fore end extends along said head surface away from said magnetoresistance element, and is exposed along said head surface and connected to a ground voltage.

3. A magnetoresistance effect type thin film head comprising:
   a magnetoresistance effect element provided in which the longitudinal direction of said magnetoresistance effect element is vertical to a head surface facing and adapted to cooperate with a disc surface,
   two electrodes substantially arranged in parallel and respectively formed at a fore end and a rear end of said magnetoresistance effect element,
   wherein the electrode formed at the fore end extends along said disc surface away from said magnetoresistance element, and is exposed along said head surface and connected to the same ground voltage as said disc surface is connected to.

4. A magnetoresistance effect type thin film head having a surface for cooperating with a magnetic medium comprising:
   a magnetoresistance effect element provided in which the longitudinal direction of said magnetoresistance effect element is vertical to the head surface facing and adapted to cooperate with the surface of a disc in a disc rotating system,
   two electrodes substantially arranged in parallel and respectively formed at a fore end and a rear end of said magnetoresistance effect element,
   wherein the electrode formed at the fore end extends along said head surface away from said magnetoresistance element, and is exposed along said head surface and connected to a ground voltage which is common to a ground voltage of said disc rotating system.

* * * * *